United States Patent Office 2,886,416
Patented May 12, 1959

2,886,416
PREPARATION OF HYDROGEN PEROXIDE

Joseph R. Cox and Thurman E. Brown, Corpus Christi, Tex., assignors to Columbia-Southern Chemical Corporation No Drawing. Application April 28, 1954
Serial No. 426,294

4 Claims. (Cl. 23—207)

This invention relates to an improvement in the method of making hydrogen peroxide. It is known that hydrogen peroxide can be made by successive hydrogenation and oxidation of certain organic compounds, followed by extraction of the evolved hydrogen peroxide from the organic compound with water. In a typical process of such a character, certain quinones, such as 2-ethyl anthraquinone, have been used. Such processes have been described in the following United States Letters Patent: 2,158,525; 2,215,883; 2,657,980; 2,668,753.

Hydrogenation in the processes mentioned above normally has been conducted in the presence of a metallic hydrogenation catalyst such as palladium, Raney nickel or the like. The metal catalyst usually is supported on a carrier such as active alumina, active carbon, silica or the like, and is kept suspended in the quinone or solution thereof by agitation, or is maintained in a bed through which the solution is allowed to flow. As a consequence of the hydrogenation, the quinone is converted to the corresponding hydroquinone.

In the oxidation stage, the hydroquinone produced by the hydrogenation is separated from the catalyst and then is oxidized with air or oxygen to regenerate the quinone and to produce hydrogen peroxide. This process commonly is performed in the absence of catalyst, simply by bubbling air or oxygen through a solution of the hydroquinone.

Following the oxidation step, the solution is extracted with water. This step is hereinafter called the "extraction step." The water phase contains hydrogen peroxide which may be recovered by distillation or used as such. The organic phase containing the quinone and solvent therefor is reused in subsequent cycles for production of further hydrogen peroxide.

The practice of this process has been complicated by the fact that from time to time the catalyst in the hydrogenation step tends to become inactive. When it is used as a suspension in he solution, it often coagulates and settles out to an extent such that little or no catalyst remains suspended in the liquid. This is quite serious since hydrogenation ceases to take place under such circumstances.

According to this invention it has been found that this difficulty may be avoided, or at least substantially minimized, by conducting the hydrogenation step at a temperature of at least 5 to 10° F. above that at which the extraction step is conducted. By operating in this way, settling of the catalyst can be minimized or even substantially eliminated. Moreover, tendency of the catalyst to become inactive is appreciably reduced.

The extraction step preferably should be conducted at a relatively low temperature. Temperatures below about 100° F. normally are found to be preferable in order to minimize the amount of water in the organic phase and the amount of organics in the water phase, i.e. to sharpen the separation between the phases. Thus, the temperature of the organic solvent leaving the water phase in the extraction step should be held below 100° F., preferably 50 to 80° F.

The organic phase thus separated from the water is substantially saturated with water at the temperature of extraction. This solution may be treated with adsorbents, such as alumina, to remove tar and like impurities, and then is recycled to the hydrogenation step. Frequently, this solution contains a small amount of hydrogen peroxide which may or may not be destroyed prior to hydrogenation. It also contains some water. The presence of water in limited concentration below saturation is valuable because it materially increases the rate of hydrogenation. However, excess water is undesirable since it tends to deactivate and/or coagulate the catalyst. In general, it is found advantageous to maintain a water concentration of about 50 to 95 percent of saturation at the temperature of hydrogenation.

The process is best conducted using quinones as the material to be hydrogenated. Typical compounds of this character are the 2-alkylated anthraquinones, such as 2-ethyl anthraquinone, 2-methyl anthraquinone, 2-n propyl anthraquinone, 2-tertiary butyl anthraquinone, and the corresponding tetrahydro anthraquinones, such as 2-ethyl tetrahydro anthraquinone, and the like.

The above compounds are used in solution dissolved in a suitable organic solvent which is essentially immiscible with water and which is capable of dissolving the quinone and the hydroquinone produced on hydrogenation. Mixtures of solvents usually are used for this purpose. Typical solvents of this character include: Mixtures of a primary or secondary alcohol, such as amyl alcohol, hexanol, cyclohexanol, diisobutyl carbinol, etc., with hydrocarbons, such as benzene, xylene, alpha methyl naphthalene, or the like.

Esters of cyclohexanol and alkyl substituted cyclohexanols with monobasic acids, such as acetic acid, propionic acid, butyric acid or the like, have been found to be especially useful as the solvent for the practice of the present invention. One of the best of such solvents is methyl cyclohexyl acetate. These solvents may be used with or without other solvents, such as benzene, diethyl benzene, triethyl benzene or the like.

The temperature at which the hydrogenation step may be conducted normally ranges from 50 to 125° F., the exact temperature being determined by the temperature of the extraction step. In the application, the term "temperature of the extraction" is considered to be the temperature of the organic phase when it is removed from the water phase. Thus, in extraction in a countercurrent column, the temperature of the organic phase at the exit end of the extraction column where it leaves the water phase is considered to be the temperature of extraction. This is true even though the temperature at other levels in the column may be substantially higher or lower.

It is not necessary that the temperature of hydrogenation be greatly higher than that of the extraction. A differential of 5 to 25° F. (rarely more than 50° F.), between the temperature of the organic solvent leaving the extraction portion of the column and the temperature of hydrogenation normally is adequate although larger differences are permissible. Hydrogenation temperature rarely exceeds 125° F.

Following hydrogenation, the catalyst is removed, the solution oxidized to regenerate hydrogen peroxide, and recycled for extraction of the hydrogen peroxide.

The following example is illustrative:

Example I 2-ethyl anthraquinone was dissolved in a solvent consisting of 15 parts by volume of triethyl benzene and 85 parts by volume of methyl cyclohexyl acetate to produce a solution containing 42 grams of 2-ethyl anthraquinone per liter of solvent. About 100 gallons of this solution was placed in a hydrogenation chamber and circulation of further solution at the rate of 3 gallons per minute into and out of the reactor was begun. The solution was withdrawn from the hydrogenator through a filter capable of removing catalyst, and was delivered to an oxidizer containing 150 gallons of solution at a rate of about 3 gallons per minute. Solution was withdrawn from the oxidizer at the same rate and delivered to the bottom of a continuous extraction column, water being supplied to the top of the column. Solution coming from the top of the column was passed through a bed, several feet deep, of active alumina having a particle size of 8 to 14 mesh, and was returned to the hydrogenator.

After circulation was commenced, the hydrogenator was purged with nitrogen. Thereafter, 5 pounds of metallic palladium catalyst on alumina carrier was suspended in the hydrogenator solution and hydrogen gas was introduced into the mixture at a rate of 6 to 7 cubic feet per minute, measured at 760 millimeters pressure and a temperature of 70 F., effecting turbulent agitation of the mixture, suspension of the catalyst, and hydrogenation of the anthraquinone. This process was conducted continuously by feeding in fresh solution at 3 gallons a minute and withdrawing solution containing the 2-ethyl anthrahydroquinone in amount equivalent to 4 to 5 grams of hydrogen peroxide. Further catalyst was added from time to time to maintain this rate of hydrogenation. During the hydrogenation the solution was held at a temperature of 80 to 125° F.

The hydrogenated solution was continuously removed from the hydrogenator, filtered free of catalyst, and delivered to a reactor in which it was reacted with air at an ambient temperature of about 30° C., usually about 32° C., until the anthrahydroquinone was substantially completely oxidized. The oxidized solution was extracted with water in the proportion of about one part by volume of water per 30 volumes of solvent at a temperature of about 80° F. or below, a water solution containing 12 percent by weight of $H_2O_2$ being produced.

The organic solution which was saturated with water at the extraction temperature was passed through a bed of active alumina to remove entrained water, tars, and the like. The solution thus treated was heated to a temperature about 5 to 15° F. above that at which the extraction was conducted. The heated solution was recycled to the hydrogenator for further hydrogenation, as described above. The process was continued over a long period of time without serious coagulation or degradation of the catalyst.

Although the present invention has been described with particular reference to the specific retails of certain embodiments thereof, it is not intended that such details shall be regarded as limitations upon the scope of the invention except insofar as included in the accompanying claims.

What is claimed:

1. In the method of preparing hydrogen peroxide by successively hydrogenating a quinone in the presence of a catalyst suspended in the quinone, oxidizing the hydrogenated product to regenerate the quinone and to generate hydrogen peroxide, and extracting the resulting hydrogen peroxide with water and recycling the regenerated quinone for further hydrogenation, the improvement which comprises avoiding agglomeration of said catalyst by heating the regenerated quinone to a temperature of at least 5° F. above the temperature of the quinone during extraction, and hydrogenating the heated, regenerated quinone in the presence of said catalyst.

2. The process of claim 1 wherein the hydrogenation is conducted at a temperature of 5 to 50° F. above that of the extraction, and the extraction is conducted at a temperature below about 125° F.

3. The process of claim 1 wherein the catalyst is metallic palladium.

4. The process of claim 1 wherein the catalyst is metallic palladium and the water concentration of the quinone is 50 to 95 percent of saturation.

References Cited in the file of this patent

UNITED STATES PATENTS

| | | |
|---|---|---|
| 2,059,569 | Filson et al. | Nov. 3, 1936 |
| 2,533,581 | Harris | Dec. 12, 1950 |
| 2,668,753 | Harris et al. | Feb. 9, 1954 |
| 2,739,042 | Corey et al. | Mar. 20, 1956 |